United States Patent [19]
Anderson et al.

[11] Patent Number: 6,089,023
[45] Date of Patent: Jul. 18, 2000

[54] STEAM GENERATOR SYSTEM OPERATION

[75] Inventors: David K. Anderson, East Longmeadow, Mass.; Wayne S. Counterman, Wellsville, N.Y.; Mark Palkes, Glastonbury, Conn.; Friedrich W. Pinnekamp, Mellstorf, Switzerland; Kjell E. G. Porle, Växjö, Sweden; Michael J. Rini, Hebron, Conn.; James David Seebald, Wellsville, N.Y.; Srivats Srinivasachar, Sturbridge, Mass.; Majed A. Toqan, Avon, Conn.

[73] Assignee: Combustion Engineering, Inc., Windsor, Conn.

[21] Appl. No.: 09/069,405

[22] Filed: Apr. 29, 1998

[51] Int. Cl.$^7$ ........................................ F01K 7/34
[52] U.S. Cl. ............................... 60/653; 60/648
[58] Field of Search .................... 60/648, 650, 653; 110/251, 345, 346

[56] References Cited

U.S. PATENT DOCUMENTS

| | | | |
|---|---|---|---|
| 3,726,239 | 4/1973 | Burbach | 110/1 J |
| 4,090,455 | 5/1978 | McCartney | 110/232 |
| 4,704,972 | 11/1987 | Marchand | 110/345 |
| 5,305,697 | 4/1994 | Greene et al. | 110/345 |
| 5,333,558 | 8/1994 | Lees, Jr. | 110/346 |
| 5,527,983 | 6/1996 | Tadmor et al. | 110/345 X |
| 5,553,555 | 9/1996 | Gosselin, Jr. et al. | 110/215 |

FOREIGN PATENT DOCUMENTS

| | | |
|---|---|---|
| 0011118 | 5/1980 | European Pat. Off. . |
| 2572952 | 5/1986 | France . |
| 4327476 | 2/1995 | Germany . |
| 772685 | 4/1957 | United Kingdom . |

OTHER PUBLICATIONS

Patent Abstracts of Japan, Publication No. 62045357, pub. date Feb. 27, 1987.

*Primary Examiner*—Hoang Nguyen
*Attorney, Agent, or Firm*—Alix, Yale & Ristas, LLP

[57] ABSTRACT

The flue gas temperature coming from an air preheater to a particulate collection device such as an electrostatic precipitation or fabric filter is reduced to improve the operation of the particulate collection device. This may be done by reducing the exit flue gas temperature from the air preheater or reducing the temperature after exiting. In one embodiment, air in excess of that needed for combustion is passed through the air preheater with the heated excess air either being dumped or used for a variety of purposes in the plant. A particular embodiment involves segmenting the air outlet side of a rotary regenerative air preheater and withdrawing the excess air from the segment where the dust loading is the lowest. Further, additional cooling of the flue gas can be provided by reducing the quantity of primary air that typically bypasses the air preheater and then providing other ways to control the primary air temperature to the pulverizers. The flue gas temperature may also be cooled after the air preheater by heat exchange or spray cooling with water.

17 Claims, 9 Drawing Sheets

STEAM GENERATOR SYSTEM OPERATION

BACKGROUND OF THE INVENTION

The present invention relates to a method for improving the performance of particulate collection devices in coal fired steam generating plants. More specifically the invention relates to the control of the temperature of the flue gas flowing from the air preheater to an electrostatic precipitator or baghouse filter.

Coal fired steam generating plants employ air preheaters to transfer heat from the flue gas to the incoming combustion air and many employ electrostatic precipitators or baghouse filters downstream from the air preheater to remove the particulate fly ash from the flue gas prior to discharge. Depending upon the particular coal being used and the resulting nature of the fly ash produced including the sulfur content, the temperature of the flue gas entering the electrostatic precipitator or baghouse can have a significant impact on the collection efficiency. For example, the so-called back corona in the electrostatic precipitator can be a major source of increased particulate emissions for high resistivity fly ash and the flue gas temperature can significantly impact the back corona effect. Likewise, the flue gas temperature can significantly affect the caking properties of the fly ash in baghouse fabric filters.

For the reasons stated above, it is desirable to be able to control the temperature of the flue gas entering the precipitator or baghouse. On the other hand, the requirements for the quantity and temperature of the primary and secondary combustion air and the design of the air preheater have a basic effect on the flue gas temperature leaving the air preheater. Also, the temperature of the flue gas leaving the air preheater cold end needs to be controlled to avoid condensation and plugging.

SUMMARY OF THE INVENTION

The present invention relates to the reduction of the flue gas temperature coming from an air preheater to a particulate collection device comprising an electrostatic precipitator or fabric filter. More specifically, the invention involves modifying the operation of the air preheater to reduce the exit flue gas temperature and/or reducing the flue gas temperature after exiting the air preheater but prior to the particulate collection device. In modifying the air preheater operation, the air mass flow through the air preheater is increased in excess of that required for combustion and then using that excess air for one or more of a variety of purposes in the plant other than combustion or merely dumping the excess air. One aspect of the invention involves a method of obtaining a relatively clean excess air stream to reduce particulate emissions by segmenting the air outlet side of a rotary regenerative air preheater and withdrawing the excess air from the segment where the dust loading is the lowest. Additional air may also be passed through the air preheater by reducing the quantity of primary air that bypasses the air preheater and providing other ways to control the temperature of the primary air to the pulverizers. A further method of controlling the flue gas temperature to the particulate collection device is to cool the flue gas after it passes through the air preheater by heat exchange with a cooler steam generator stream or by spray cooling with water. The cooling after the air preheater can be used alone or it can be used in conjunction with the modification of the air preheater operation. A further aspect of the invention is the control of the process to maintain the desired temperature in response to the various system parameters.

DESCRIPTION OF THE PREFERRED EMBODIMENT

In air preheaters, the capacity-rate of the air ($C_A$) and the capacity-rate of the flue gas ($C_G$) as well as the air side effectiveness ($E_A$) and gas side effectiveness ($E_G$) control the operation. The capacity-rate is the product of the mass flow times the specific heat of the medium. In a typical coal fired boiler operation, the mass flow of the air and the specific heat of the air are each less than the corresponding values for the gas stream. As an example, the air flow rate may be 4,670,000 lb./hr. with a specific heat of 0.247 BTU/lb. °F. while the gas flow rate may be 5,600,000 lb./hr. with a specific heat of 0.264 BTU/lb. °F. This gives a ratio of $C_A/C_G$ of 0.78 which means that the amount of energy which can be removed from the gas stream is dictated by the air stream. Even in a case where the air outlet temperature is equal to the gas inlet temperature ($E_A=1$), the gas side effectiveness ($E_G$) is 0.78 since $E_G=E_A C_A C_G$. Since $E_G$ also equals the temperature of the gas in (TGI) minus the temperature of the gas out (TGO) divided by the temperature head, and assuming a TGI of 750° F. and a temperature of the air in (TAI) of 75° F., the lowest possible TGO equals 223.5° F. In reality, an $E_A$ above 0.9 requires a very large air preheater surface area increase. At a $C_A/C_G$ of 0.8, to go from an $E_A$ of 0.909 up to 0.93 (an increase of 2.3%) requires an 18% increase in surface area. For the above example of TGI=750° F. and TAI=75° F., an $E_A$ of 0.909 equals an $E_G$ of 0.709 (0.909×0.78) which results in a TGO of 271° F. and TAO of 689° F. If $C_A/C_G$ is increased to 0.9 for the same surface area, the $E_A$ will be 0.88 and there will be a loss in air preheat down to 669° F., 20° F. lower. However, the $E_G$ is now 0.88×0.9=0.792 which gives a TGO of 215° F., a decrease in TGO of 56° F. At 215° F., the electrostatic precipitator can be much smaller and save more dollars than the present value of the loss of 20° F. of preheat. The method for increasing $C_A/C_G$ is to increase the mass flow of air and then "dump" the excess heated air which is not needed for combustion. Dumping the excess air usually involves using the heated air somewhere in the plant. One of the uses for heated air is to reheat the saturated flue gases leaving a scrubber prior to discharge up the stack to aid in buoyancy and reduce plume visibility. However, a potential problem with using excess air from the air preheater for this purpose or any other purpose where the excess air is to be discharged to the atmosphere is that it is often contains significant amounts of particulate material which could restrict its use because of emission limits.

Figure 1:
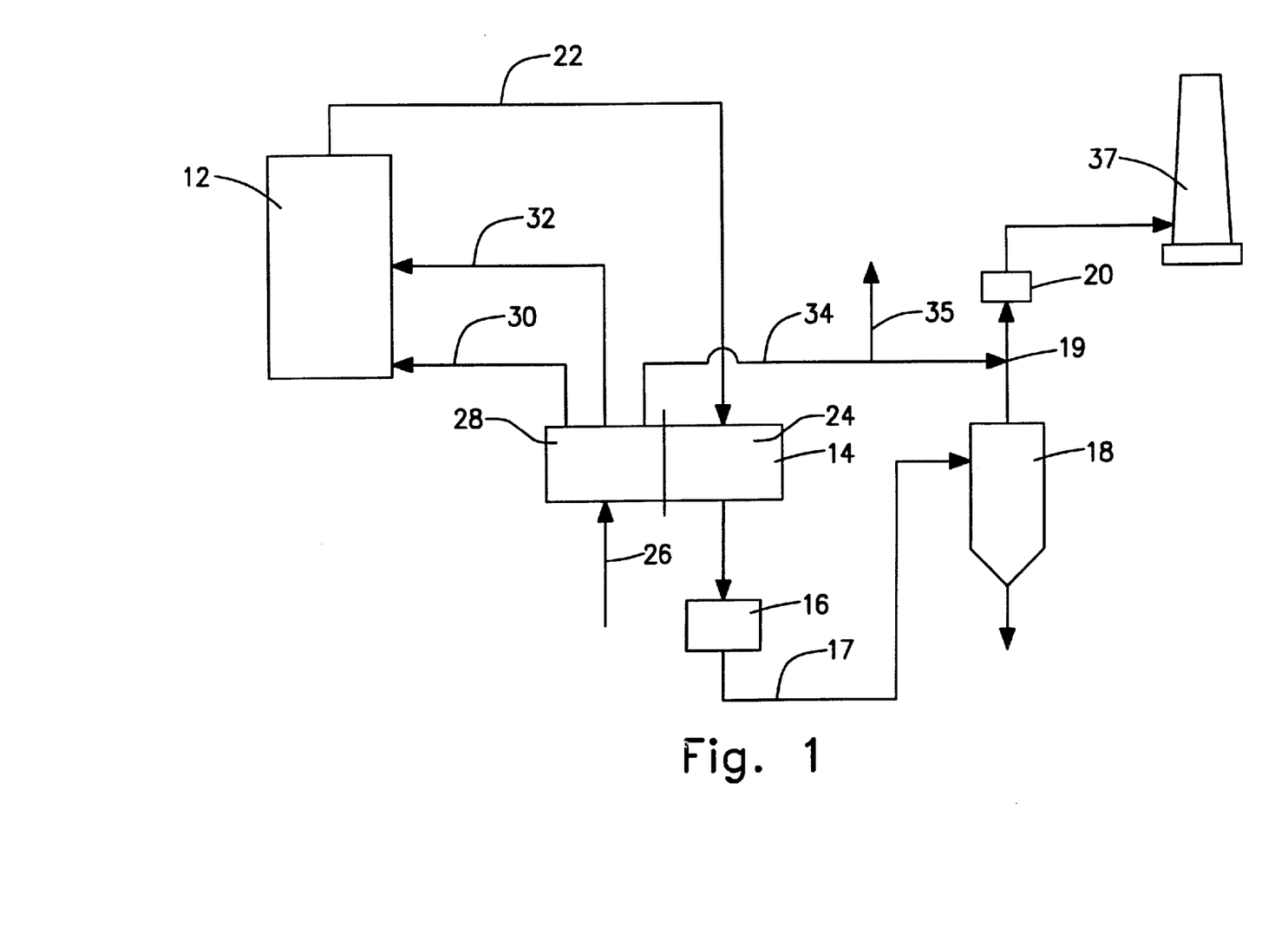
FIG. 1 is a schematic flow diagram of a steam generator system incorporating one embodiment of the present invention.

Although the following description of various embodiments of the invention will usually refer specifically to electrostatic precipitators, the invention is also applicable to baghouse filters. Also, the description is usually directed to rotary regenerative air preheaters but at least some of the embodiments of the invention are also applicable to recuperative air preheaters. FIG. 1 of the drawings illustrates in schematic form a steam generator system including a steam generator 12, an air preheater 14, an electrostatic precipitator 16, a flue gas scrubber 18 and a stack gas reheater 20. This arrangement of components is typical of steam generator systems and particularly of coal fired steam generators where electrostatic precipitators are used to remove particulates from the flue gas and scrubbers are used to remove gaseous pollutants. The flue gas 22 transfers heat to the heat exchange surface in the flue gas side 24 of the air preheater 14 and this heat is picked up by the incoming air 26 in the air side 28 of the air preheater 14. Most of the heated air is used for primary combustion air 30 and secondary combustion air 32. The third heated air stream 34 will be explained hereinafter. The flue gas 17 from the electrostatic precipitator 16 is scrubbed at 18 and reheated at 20.

As discussed in the background of the invention, it is desirable to increase the mass flow of air over and above the quantity required for combustion. This is done to increase $C_A/C_G$ and decrease the flue gas temperature for the benefit of the electrostatic precipitator 16. As also previously discussed, this excess air is "dumped" which usually means using it elsewhere in the plant. In FIG. 1, the excess air which is dumped is the air stream 34. One of the major uses for the excess heated air is to reheat or assist in the reheating of the saturated stack gas from the flue gas scrubber 18 above the dew point to reduce plume visibility and to aid in buoyancy. In FIG. 1 as well as FIGS. 3 and 5, this is illustrated by the addition of the excess air stream 34 to the stack gas at 19 and then discharging the mixture up the stack 37. In addition, a heat transfer device 20 such as a steam coil reheater or a burner may be used for transferring heat to the flue gas. The use of the excess air together with the heat transfer device 20 will reduce the size that otherwise would be required for the heat transfer device. Instead of using the excess air to reheat the flue gas, the excess air stream 34 may merely be dumped to atmosphere at 35. If desired, this dump air 35 may be cleaned such as by a filter 33. Since the flow rate of the dump air 35 may be small, only a small filter device would be needed.

The problem with using heated air from the air preheater for mixing with the flue gas, which has now been cleaned, is that the air picks up significant amounts of particulate material from the air preheater. This is particularly true with fuel with a high ash content such as coal. Such an air stream containing any significant particulate load could not be mixed with flue gas and discharged up the stack because of limits on stack gas emissions.

As the rotor of a rotary regenerative air preheater rotates from the gas side to the air side, particulates which are carried over by the flue gas volume contained in the open spaces of the heat exchange elements into the air side begin to be picked up by the air flow. In addition, more particulates may be sheared from the heat exchange surfaces by the action of the air flow. The result is that most of the particulates which are picked up by the air stream are picked up at the beginning of the travel of the rotor through the air side. As the rotor progresses through the air side, the particulates which are picked up diminish as the rotor passes through the air side. In other words, the heated air exiting the air side is cleanest towards the end of the passage of the rotor through the air side. Stated another way, the air is cleanest just before the rotor sections pass from the air side back into the gas side. In effect, there is a gradient for the particulate content of the heated air with the content gradually decreasing upon passage of the rotor through the air side.

Figure 2:
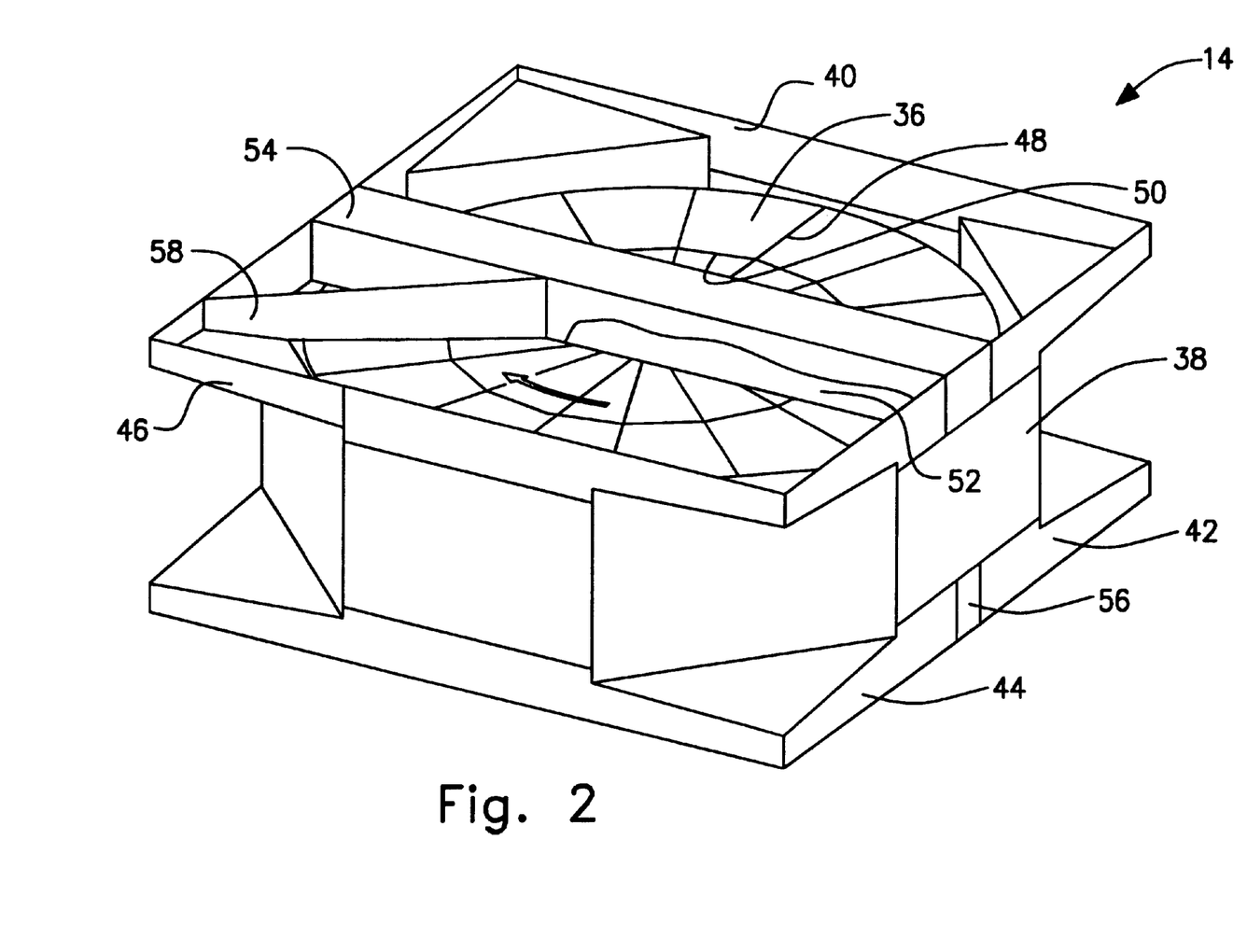
FIG. 2 is a perspective view of a rotary regenerative air preheater incorporating means for practicing the present invention in accordance with the embodiment of FIG. 1.

In the embodiment of the present invention shown in FIG. 1, rather than merely dumping a certain percentage of the gross air flow, a specific portion of the heated air flow on the air discharge end of the air preheater is selected as the source for the dump air such that the elected portion is the cleanest air in terms of particulate content. This is done by segmenting the air discharge end of the air preheater and withdrawing the dump air essentially only from that segment which is the last segment in the direction of rotation through the air side. FIG. 2 is a perspective view of an air preheater 14 constructed in accordance with this embodiment of the present invention. The air preheater comprises the rotor 36, the rotor housing 38, the gas inlet and outlet connecting plate duct assemblies 40 and 42 respectively and the air inlet and outlet connecting plate duct assemblies 44 and 46 respectively. These connecting plate duct assemblies form the connections and the transition between the duct work and the generally circular or polygonal rotor housing 38. The illustrated rotor is of a conventional type which is divided into sectors by the rotor diaphragms 48 and with these sectors being further divided into compartments by the stay plates 50. The air preheater is divided into a gas side and an air side by the usual sector plates 52 on the top and bottom (not shown) of the rotor. Also, adjacent the upper and lower ends of the rotor between the air side and the gas side are the upper and lower center sections 54 and 56 respectively. Various other detailed components of a typical air preheater would be included, even though not shown, such as radial and axial seals to reduce the leakage of air and gas between the sectors.

The air preheater used in this embodiment of the present invention is equipped with means to segregate that portion of the heated air flow which comprises the dump air. This is shown in FIG. 2 as the partition 58 which extends generally radially across the air outlet connecting plate duct assembly 46. This partition 58 is located to segregate the desired portion of the total air flow as dump air. Suitable ducting means would then route this segregated dump air, which is designated as 34 in FIG. 1, to the desired location for the end use of the dump air such as reheating the flue gas. As can be seen by the arrow indicating the direction of rotation in FIG. 2, the partition is located such that the dump air is withdrawn from the last portion of the air side before the rotor re-enters the gas side. As an example, if there is 10% excess air being used above that required for combustion, the partition 58 would be located so that it segregates approximately 10% of the flow area of the air outlet connecting plate duct assembly 46. The remaining 90% would be connected to the duct work supplying the combustion air to the furnace. In addition to the partition 58, there may be other conventional partitions to segregate the primary and secondary combustion air and in some cases even tertiary air.

Figure 3:
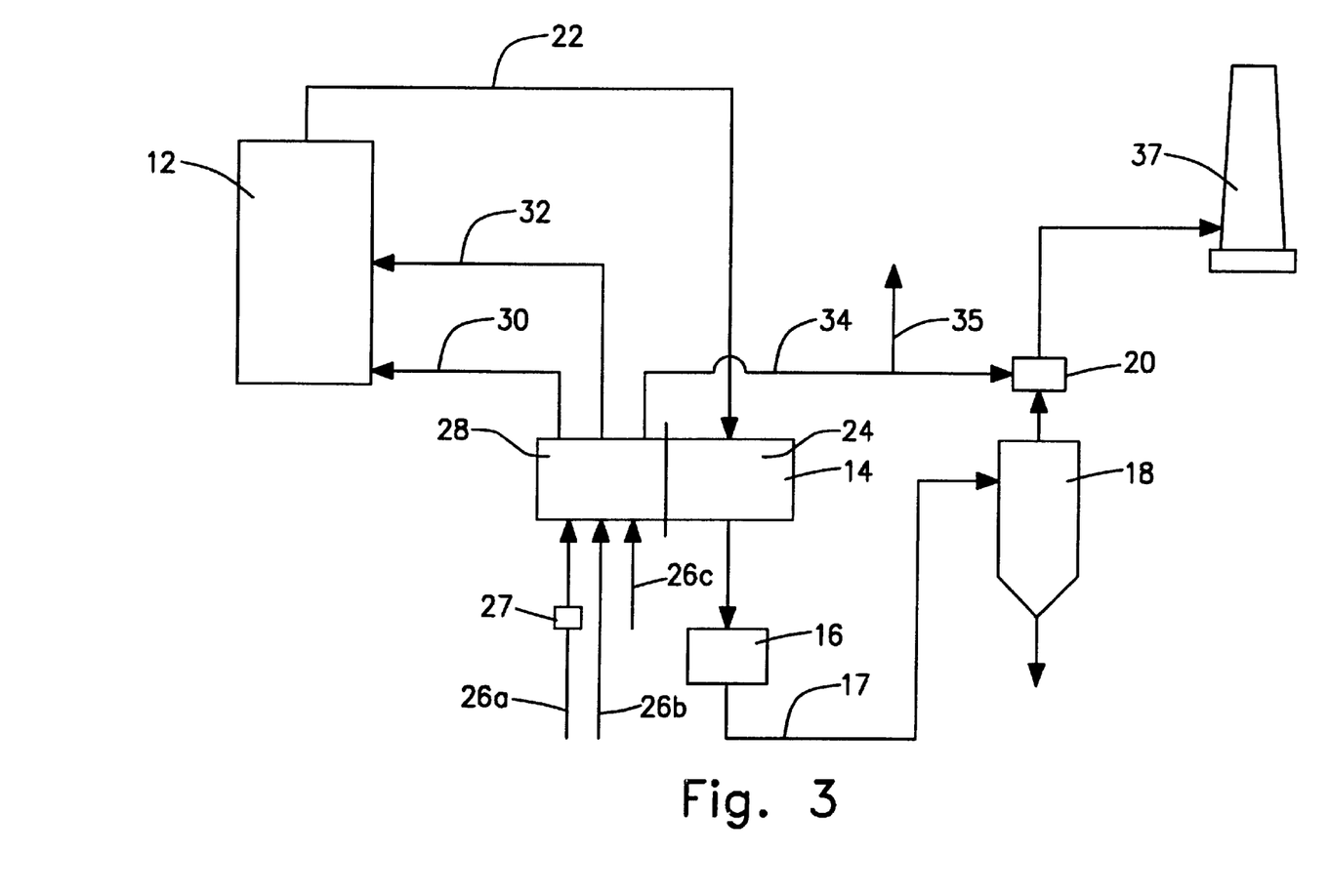
FIG. 3 is a schematic flow diagram similar to FIG. 1 but illustrating a modification of the FIG. 1 embodiment.

FIG. 3 is one of the alternate embodiments of the present invention which can be used where insufficient particulates are removed from the rotor in the beginning of the passage through the air side and excessive particulates are being picked up by the dump air. The air velocity in the first section of the air side can be boosted to help shear the particulates in the location farthest from the dump air section. This is illustrated diagrammatically in FIG. 3 by the three incoming air streams 26a, 26b, and 26c. The air stream 26c is the incoming dump air while stream 26b is an intermediate stream in the middle of the air side. Stream 26a, which is at the beginning of the passage of the rotor through the air side, includes means 27 such as a booster blower for increasing the velocity of the air through that section. This increased air velocity tends to shear and dispose of the particulates at the beginning of the air side.

An additional benefit of the present invention is seen in boiler efficiency. Due to the regenerative principle, the heat transfer sheets which the air passes over are hottest when they first enter the air side, and coldest just before they enter the gas side. This metal temperature difference produces a gradient in the air preheat temperature with the hottest temperatures on the air side at the location closest to the gas side where the elements are rotating in, and coldest closest to the gas side where the elements are rotating out. This difference, or swing as it is typically called, can be significant, for example 60° F. When the dump air is pulled from the coldest section, the average temperature of the remaining combustion air is hotter than the average temperature of the entire air flow. For example, the average temperature of the combustion air may be about 3° F. hotter for the 60° F. swing situation with 10% dump air. This hotter combustion air increases boiler efficiency.

Figure 4:
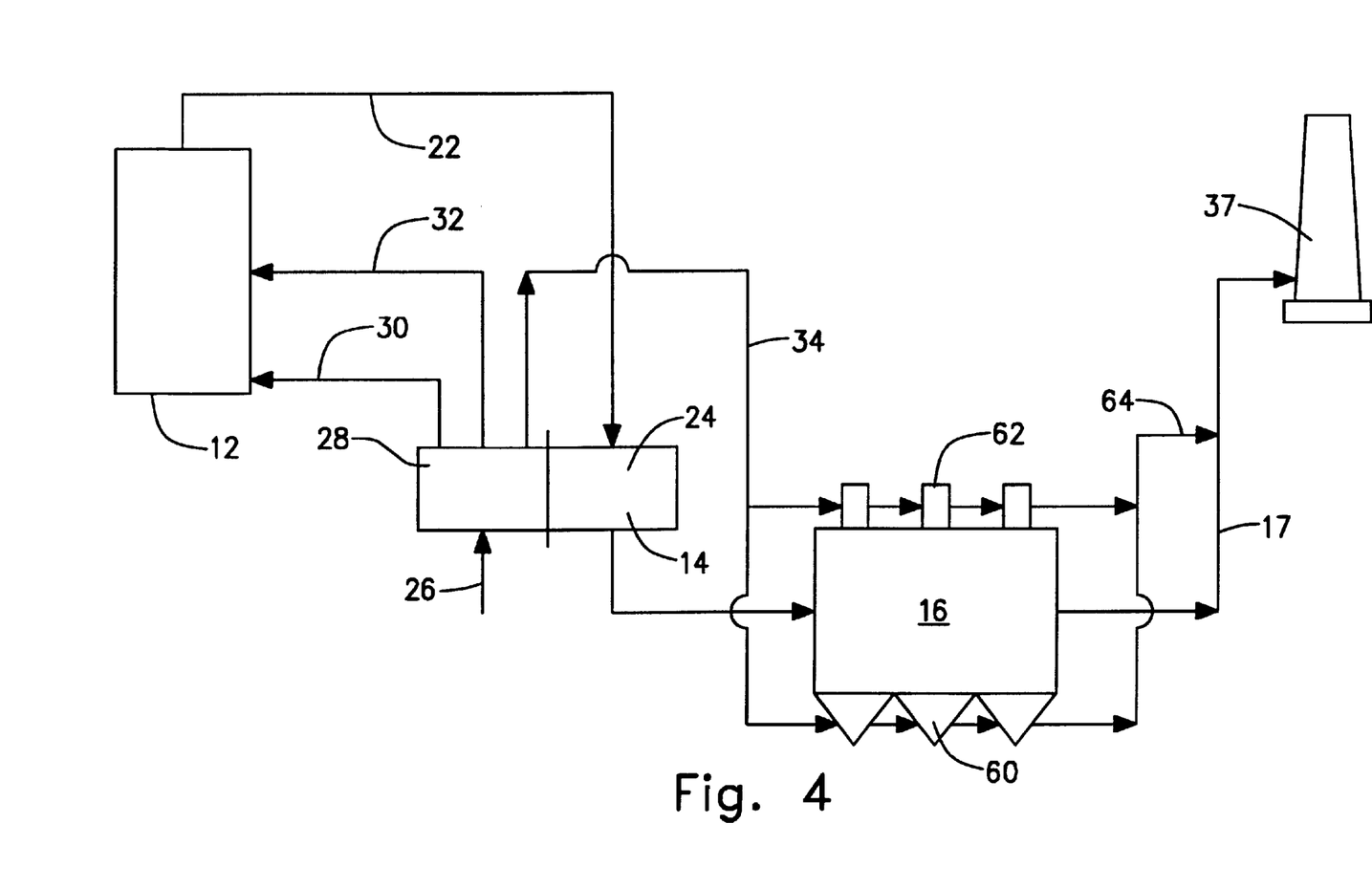
FIG. 4 is a schematic flow diagram also similar to FIG. 1 but illustrating an alternative arrangement for using the heat in the excess air.
Figure 5:
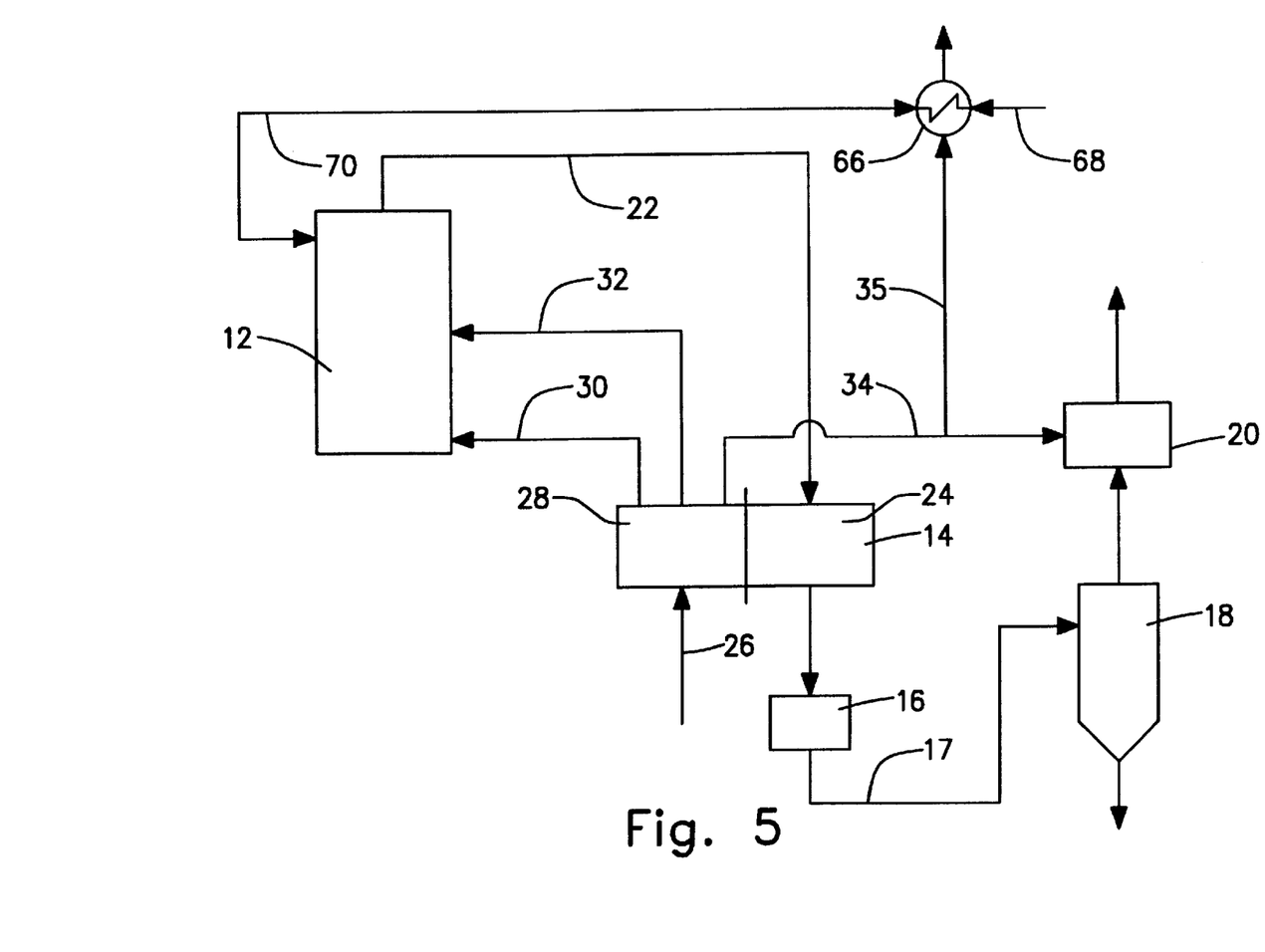
FIG. 5 is also a schematic flow diagram similar to FIG. 1 but illustrating a further use for the excess air.

FIG. 4 illustrates another use for the excess heated air. A significant amount of energy is required to maintain a temperature high enough in various components of the electrostatic precipitation such as the hoppers and insulators to avoid local condensation. Normally, this energy is provided by electrical heaters or steam coils. In the particular embodiment of the present invention illustrated in FIG. 4, the source of the heat for maintaining a satisfactory temperature in the hoppers 60 and insulators 62 is the excess heated air 34. The excess air in this FIG. 4 embodiment is then vented to the stack at 64 along with the flue gas 17 from the electrostatic precipitator. FIG. 5 illustrates a further use of the excess heated air and involves locating a feedwater heater 66 in the excess heated air stream 35. The feedwater heater preheats the feedwater 68 prior to the feed 70 into the steam generator 12.

Figure 6:
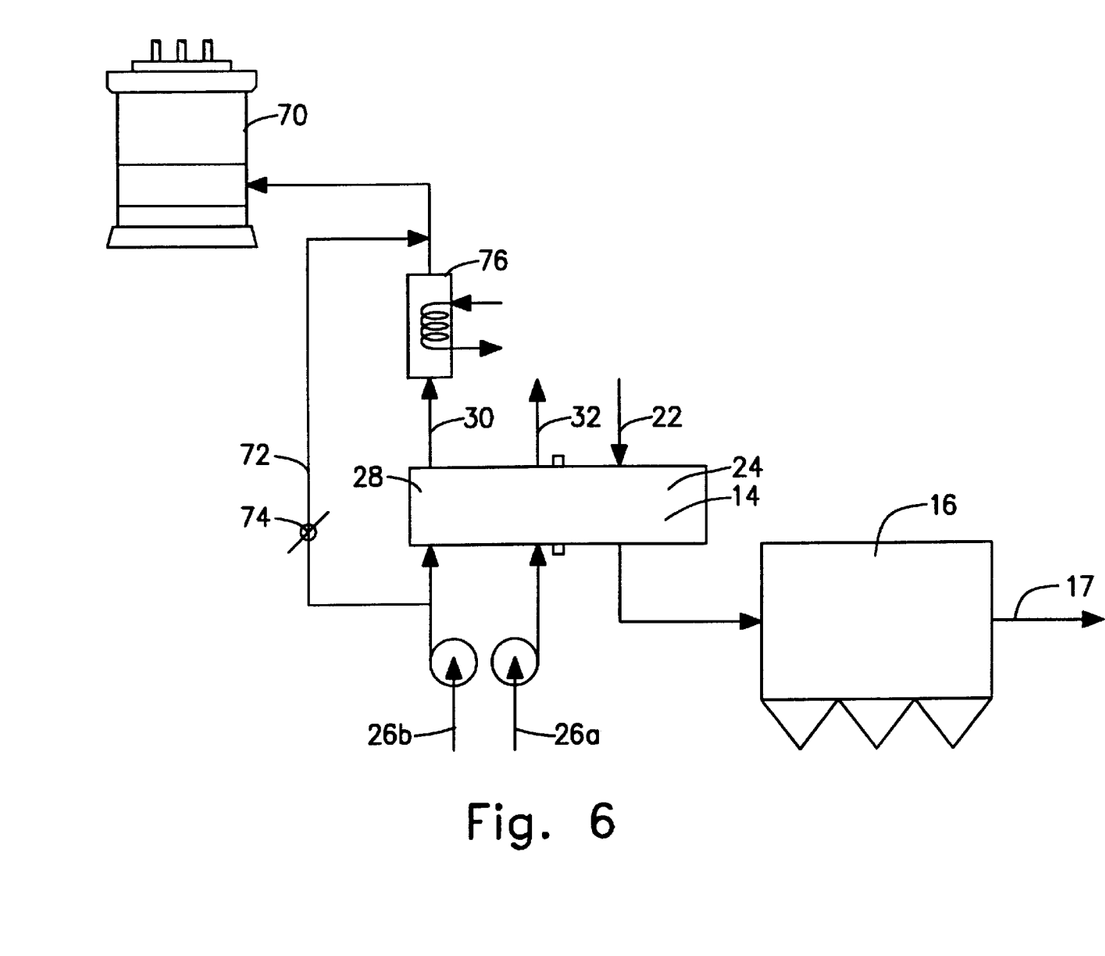
FIGS. 6 and 7 illustrate arrangements for putting additional air through the air preheater by reducing the quantity of pulverizer tempering air which bypasses the air preheater.
Figure 7:
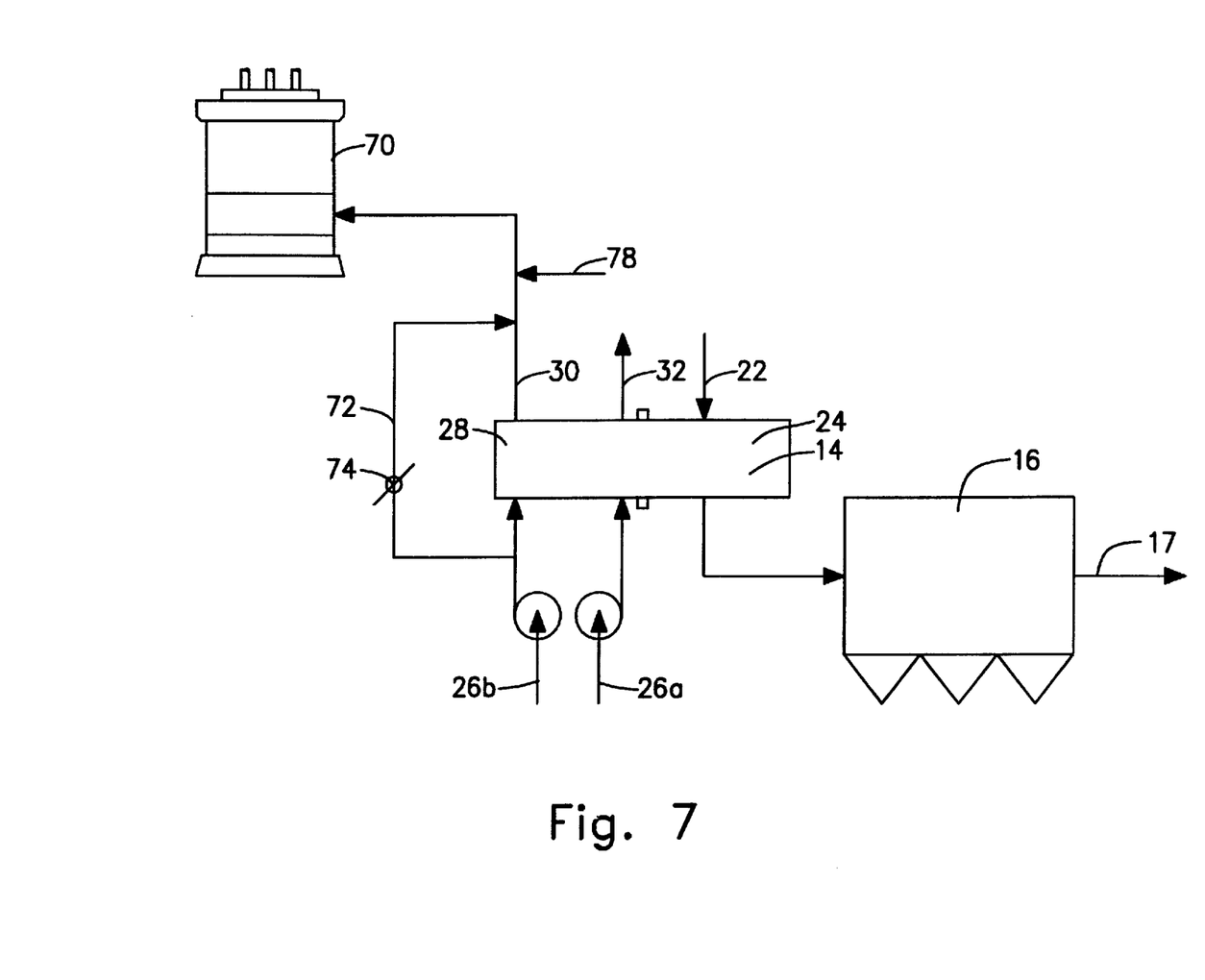

FIGS. 6 and 7 illustrate a different approach for passing excess air through the air preheater to provide additional cooling of the flue gas. In a coal fired steam generating system, the primary combustion air is fed to the coal pulverizer and serves to dry and transport the pulverized coal. Since excessively high temperatures of the coal-air mixture may result in a spontaneous combustion inside the pulverizers, the temperature of the primary combustion air to the pulverizers must be controlled. This typically involves bypassing as much as 40 or 50% of the primary air around the air heater. The bypassed air is used to control or temper the air temperature entering the pulverizers. Various coals have various recommended temperature limits which can range from about 77° C. (170° F.) up to 120° C. (248° F.). FIGS. 6 and 7 illustrate the secondary air 26a and the primary air 26b being forced through the air side 28 of the air preheater 28 of the air preheater 14 with the primary air 30 being fed to the pulverizer 70. The bypass air is carried around the air preheater 14 by the duct 72 and then reintroduced into the heated primary air thereby tempering the temperature.

In this embodiment of the present invention, a damper 74 or other flow control device is located in the bypass duct 72 to control the quantity of the bypass air. As the quantity of bypass air is decreased, the amount of primary air passing through the air preheater increases resulting in a decrease in the exit flue gas temperature. However, this reduces the quantity of tempering air and increases the temperature of the primary air to the pulverizers. Therefore, means are provided to restore the proper pulverizer temperature. In the FIG. 6 embodiment, this comprises heat exchanger 76 which cools down the primary air temperature such as by the use of condensate water. In this case, the heat exchanger 76 serves as a low level economizer. Alternately, FIG. 7 illustrates another cooling arrangement comprising the introduction of spray water 78 directly into the primary air stream to provide evaporative cooling.

Figure 8:
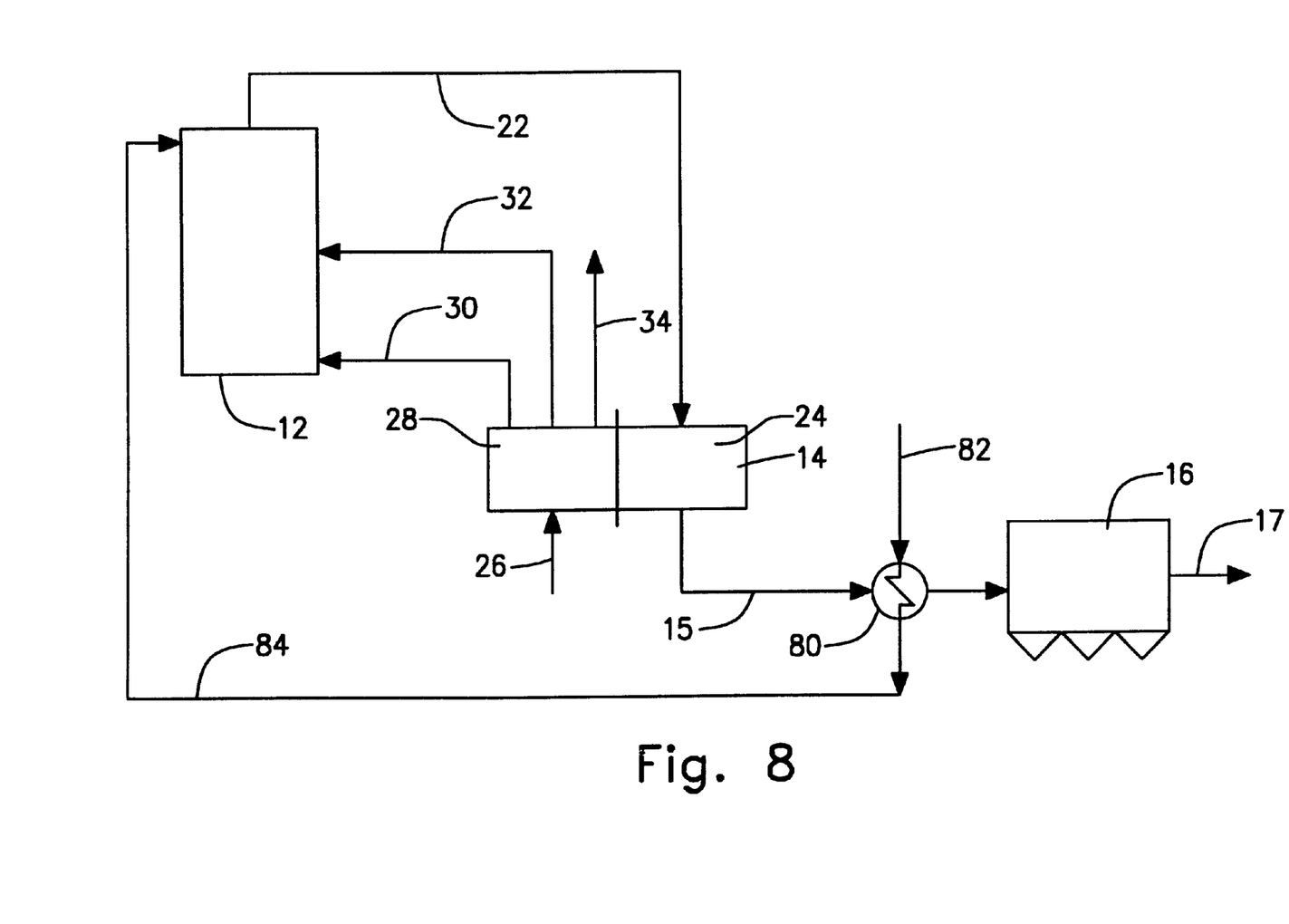
FIG. 8 illustrates an arrangement for cooling the flue gas after exiting the air preheater which may be used alone or in combination with the use of excess air through the air preheater.

FIG. 8 illustrates a further embodiment of the present invention including the cooling of the flue gas after it has passed through the air preheater but prior to the electrostatic precipitator. This may be used alone as a means of further cooling the flue gas down to a temperature appropriate for the precipitator or it may be used in conjunction with the use of excess air through the air preheater as previously discussed. In FIG. 8, the partially cooled flue gas 15 from the air preheater 14 is passed through a low temperature economizer heat exchange section 80 where the flue gas is further cooled by feedwater 82 from the steam turbine loop (not shown) to a temperature favorable for precipitator operation. The further cooled flue gas 17 then goes to the electrostatic precipitator 16 and the heated feedwater 84 goes to the boiler 12. In this manner, energy from the flue gas is transferred to the boiler working fluid (water) thereby increasing net plant efficiency as well as plant capacity. In this way, condensate is preheated that would otherwise be preheated in a feedwater heater by extracted steam. Because the need for extracted steam is reduced, the additional steam is expanded through the low pressure stages of the steam turbine to generate additional capacity.

Figure 9:
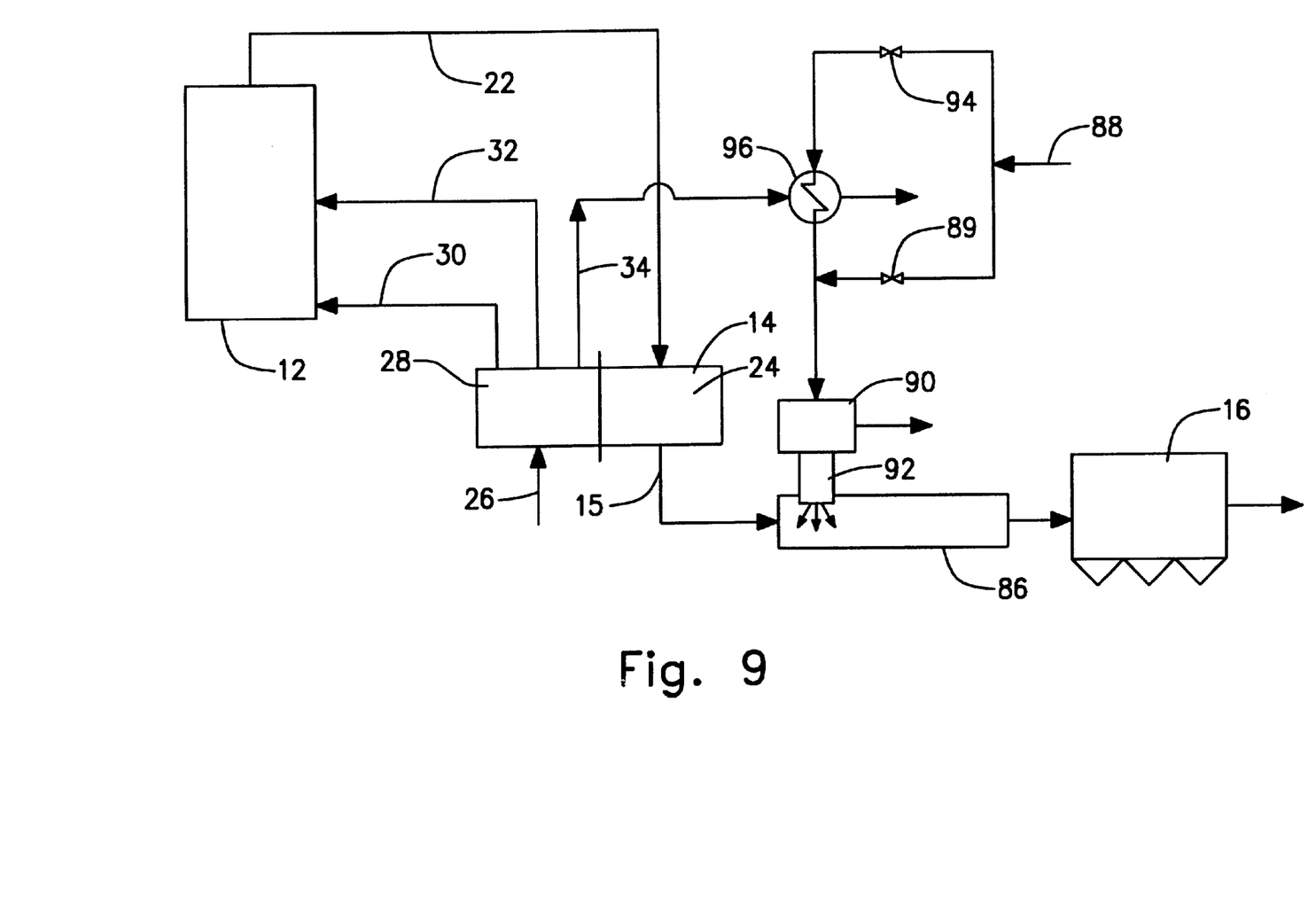
FIG. 9 illustrates an alternate arrangement for cooling the flue gas after exiting the air preheater.

FIG. 9 shows an additional method for cooling the flue gas after the air preheater. The flue gas 15 from the air preheater 14 flows into and through a spray chamber 86 and then to the electrostatic precipitator 16. In the spray chamber 86, which may be the flue gas duct itself, water droplets are injected into the flue gas stream. A portion of the sensible enthalpy of the flue gas is used to vaporize the water droplets thereby cooling the flue gas and increasing the humidity of the flue gas. In the ideal arrangement, there is complete evaporation of the water droplets before they reach the electrostatic precipitator or other surfaces where they can impact and collect. If they are not completely evaporated, they can wet the surfaces and cause ash to collect and build up. As an example, for a 400 $MW_e$ steam generator application, with a nominal flue gas flow of $4 \times 10^6$ lbs/hr, the latent heat of vaporization associated with approximately 10,000 lbs/hr water spray will enable cooling of the flue gas by 10° F. The time for complete vaporization of the droplets is a function of several parameters including droplet size, flue gas temperature and flue gas moisture content. In particular, the vaporization time varies in proportion to the square of the droplet size. In the present invention, the droplet size is limited by any one of several means.

The droplet size is limited by atomizing the water and then using a size separation device such as a cyclone, impactor, louver separator, mist elimination, electrostatic precipitator or filter to remove the oversize droplets. In FIG. 9, the water 88 through valve 89 is sprayed into the separator generally designated at 90 and then sprayed at 92 into the flue gas. The critical droplet size is determined by the size that can be vaporized at or before the inlet to the electrostatic precipitator 16. This is controlled by the outlet temperature of the flue gas from the air preheater and the available residence time in the duct between the point of the water spray and the electrostatic precipitator. As an example, a nominal residence time of 1 second and a mean flue gas temperature of 110° C. (230° F.) will completely vaporize a 30 micron droplet.

FIG. 9 also illustrates a variation of this water spray cooling process wherein superheated water is used. In this variation, the water 88 under pressure passes through valve 94 and is heated by the excess air 34 (or other heating medium) in the heat exchanger 96 to a temperature in excess of 100° C. (212° F.), preferably 120 to 130° C. (248 to 266° F.), before it is atomized and introduced into the spray chamber 86. The superheating of the spray water dramatically decreases both the mean and the maximum droplet size.

The corrosivity and fouling potential of the flue gas, primarily due to changing coal properties and/or changes in the boiler operation, can vary the cooling requirements for the flue gas entering the particulate collection device. Therefore, it is desirable to anticipate these changes and to control the cooling accordingly. This is achieved by an integrated control scheme which includes the operating parameters of the air preheater, the boiler and the particulate collection device. The scheme allows the flue gas outlet temperature from the air preheater to be varied as needed for effective operation of the particulate collection device while maintaining the needed combustion air flow and temperatures as required for effective operation of the boiler. the various inputs which may be selected for such a control system include a flue gas analysis from continuous emission monitors for such factors as $SO_2$ and $O_2$ levels, the flue gas temperature at the air preheater outlet, the secondary air flow rate, the fuel analysis, the opacity of the flue gas, the full range of boiler operation data and the electrostatic precipitator control data. The resulting output of the control system may include the control of the air preheater to (1) provide a variable amount or variable temperature of the cooling air to provide a desired outlet flue gas temperature profile to minimize the corrosion and fouling potential, (2) control the electrostatic precipitator operation such as the high voltage settings and the rapping frequency to minimize power requirements for a given emission level and (3) control the boiler operation to accept at least a portion of the excess heated air from the air preheater as combustion air to increase the boiler efficiency.

What is claimed is:

1. A method of operating a steam generating system including a steam generator which generates a flue gas stream, an air preheater which transfers heat from said flue gas stream to an incoming air stream to produce a heated air stream, and a particulate control device for removing particulates from said flue gas stream, said method comprising the steps of:
   a. passing a quantity of air through said air preheater wherein said air is heated, said quantity of air being selected to provide a desired flue gas temperature for operation of said particulate control device and including a first portion comprising combustion air and a second portion comprising excess air;
   b. withdrawing said quantity of heated air from said air preheater;
   c. passing said first portion of heated air to said steam generator as combustion air; and
   d. passing said second portion of heated air around said steam generator as excess air and discharging said excess air to the atmosphere.

2. A method as recited in claim 1 wherein said air preheater is a rotary regenerative air preheater having a heat exchange rotor and wherein said air preheater has a gas side through which said flue gas flows and an air side through which said air flows, said air side including a first segment in the direction of rotation and a last segment in the direction of rotation and comprising the steps of withdrawing said first portion of air from the first segment of said air side in the direction of rotation of said rotor and withdrawing said second portion of air from the last segment of said air side in the direction of rotation of said rotor whereby said second portion of air is cleaner than said first portion.

3. A method as recited in claim 1 wherein said steam generating system further includes a flue gas scrubber following said particulate control device and wherein heat is transferred from said excess heated air to said flue gas discharged from said flue gas scrubber to reheat said discharged flue gas.

4. A method as recited in claim 3 wherein said step of transferring heat from said excess heated air to said flue gas comprises the step of mixing said excess heated air with said flue gas.

5. A method as recited in claim 2 wherein said steam generating system further includes a flue gas scrubber following said particulate control device and wherein heat is transferred from said excess heated air to said flue gas discharged from said flue gas scrubber to reheat said discharged flue gas.

6. A method as recited in claim 5 wherein said step of transferring heat from said excess heated air to said flue gas comprises the step of mixing said excess heated air with said flue gas.

7. A method as recited in claim 1 including the step of filtering said excess heated air prior to discharge to the atmosphere.

8. A method as recited in claim 2 including the step of filtering said excess heated air prior to discharge to the atmosphere.

9. A method as recited in claim 1 wherein said particulate control device is an electrostatic precipitator which includes components requiring heating and further including the step of heating said components with said excess heated air prior to discharging to the atmosphere.

10. A method as recited in claim 9 wherein said components comprise hoppers and insulators.

11. A method as recited in claim 1 wherein said steam generating system includes a feedwater stream and further including the step of heating said feedwater stream with said heated excess air prior to discharging to the atmosphere.

12. A method as recited in claim 2 wherein said steam generating system includes a feedwater stream and further including the step of heating said feedwater stream with said heated excess air prior to discharging to the atmosphere.

13. A method of operating a steam generating system including a steam generator which generates a flue gas stream, an air preheater which transfers heat from said flue gas stream to an incoming air stream including means to produce a heated primary air stream and a heated secondary air stream and a particulate control device for removing particulates from said flue gas stream, said means to produce a heated primary air stream including a primary air supply, means for passing a first portion of said primary air supply through said air preheater to be heated and means for bypassing a second portion of said primary air supply around said air preheater as unheated tempering air and means for combining said first portion and said second portion of said primary air supply to produce a tempered primary air supply at a desired primary air temperature and wherein said method comprises the steps of increasing the quantity of said first portion and decreasing the quantity of said second portion whereby said flue gas is additionally cooled by said increased first portion to provide a desired flue gas temperature for operation of said particulate control device and whereby the temperature of said tempered primary air supply is increased and then cooling said tempered primary air supply to said desired primary air temperature.

14. A method as recited in claim 13 wherein said step of cooling said tempered primary air supply comprises the step of transferring heat therefrom to a water stream.

15. A method as recited in claim 13 wherein said step of cooling said tempered primary air supply comprises the step of injecting a water spray.

16. A method of operating a steam generating system including a steam generator which generates a flue gas stream, an air preheater which transfers heat from said flue gas stream to an incoming air stream to produce a heated air stream and a partially cooled flue gas stream, and a particulate control device for removing particulates from said flue gas, said method comprising the step of further cooling said partially cooled flue gas stream to a desired temperature for operation of said particulate control device, said step of further cooling comprising the step of spraying said partially cooled flue gas stream with water comprising the steps of atomizing said water and removing oversize droplets.

17. A method of operating a steam generating system including a steam generator which generates a flue gas stream, an air preheater which transfers heat from said flue gas stream to an incoming air stream to produce a heated air stream and a partially cooled flue gas stream, and a particulate control device for removing particulates from said flue gas, said method comprising the step of further cooling said partially cooled flue gas stream to a desired temperature for operation of said particulate control device, said step of further cooling comprising the step of spraying said partially cooled flue gas stream with superheated water droplets.

* * * * *